US012798664B2

(12) United States Patent
Kim

(10) Patent No.: US 12,798,664 B2
(45) Date of Patent: Nov. 17, 2026

(54) CURRENT CONTROL METHOD BASED ON FEEDBACK CONTROL AND EPS SYSTEM

(71) Applicant: HL MANDO CORPORATION, Pyeongtaek-si (KR)

(72) Inventor: Jungyeol Kim, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 674 days.

(21) Appl. No.: 18/206,475

(22) Filed: Jun. 6, 2023

(65) Prior Publication Data

US 2024/0101186 A1 Mar. 28, 2024

(30) Foreign Application Priority Data

Sep. 26, 2022 (KR) ........................ 10-2022-0121536

(51) Int. Cl.
*B62D 5/04* (2006.01)
*B62D 5/00* (2006.01)
*B62D 6/00* (2006.01)

(52) U.S. Cl.
CPC ........... *B62D 5/0463* (2013.01); *B62D 5/006* (2013.01); *B62D 6/008* (2013.01)

(58) Field of Classification Search
CPC ....... B62D 5/0463; B62D 5/006; B62D 6/008
See application file for complete search history.

(56) References Cited

U.S. PATENT DOCUMENTS

2016/0318443 A1* 11/2016 Lickfold .............. B62D 15/029
2020/0307686 A1* 10/2020 Namikawa ........... B62D 5/0481
2023/0016560 A1* 1/2023 Kitazume ............ B62D 5/0472

FOREIGN PATENT DOCUMENTS

JP 6070711 B2 * 2/2017 ........... B62D 5/0469
JP 2018-47725 A 3/2018
JP 2018047725 A * 3/2018 ............. G01L 5/221

OTHER PUBLICATIONS

Korean Office Action issued on Mar. 21, 2025, in connection with the Korean Patent Application No. 10-2022-0121536, with its English translation, 8 pages.

* cited by examiner

*Primary Examiner* — Jacob D Knutson
(74) *Attorney, Agent, or Firm* — Hauptman Ham, LLP

(57) ABSTRACT

The current control method based on feedback control includes identifying a final torque value that changes according to an action of a steering wheel, controlling a motor that generates auxiliary power based on the identified final torque value, determining whether a rotation angle of the steering wheel corresponds to a predetermined rack end stop (RES) angle, in response to determining that the rotation angle of the steering wheel corresponds to the predetermined RES angle, switching the final torque value to a soft end stop (SES) torque value, and controlling the motor so that rotation of the steering wheel is limited based on the switched SES torque value.

19 Claims, 6 Drawing Sheets

--RELATED ART--

CURRENT CONTROL METHOD BASED ON FEEDBACK CONTROL AND EPS SYSTEM

CROSS-REFERENCE TO RELATED APPLICATION

This application claims priority under 35 U.S.C. § 119 to Korean Patent Application No. 10-2022-0121536, filed on Sep. 26, 2022, in the Korean Intellectual Property Office (KIPO), the disclosure of which is incorporated by reference herein in its entirety.

TECHNICAL FIELD

The present disclosure relates to a current control method based on feedback control and an EPS system, and more particularly, to a current control method based on feedback control and an EPS system for performing a soft end stop through current control based on feedback control.

BACKGROUND

Recently, electric power steering (EPS), which easily assists a driver's steering force by using rotational force of a motor, is commonly used in vehicles, unlike an existing method that uses hydraulics. EPS may provide a driver with a comfortable steering feel by driving the motor from an electronic control unit (ECU) according to driving conditions of the vehicle detected by a vehicle speed sensor, a steering sensor, a torque sensor, and the like.

Meanwhile, when the driver rotates a steering wheel to the right or left end, in order to prevent noise from being generated by the steering wheel mechanically contacting both ends, a soft end stop (SES) control technique is generally used. However, the conventional SES control technique has a limitation in which a current control amount is limitedly decreased at the end, and there is an issue in that it is difficult to precisely execute an end stop function by operating sensitively to external factors.

SUMMARY

The present disclosure provides a current control method based on feedback control for solving the above issues, a computer program stored in a non-transitory computer-readable medium storing instructions, a non-transitory computer-readable medium in which a computer program is stored, and an EPS system.

The present disclosure may be implemented in a variety of ways, including a method, a system (an apparatus), a computer program stored in a non-transitory computer-readable medium storing instructions, or a non-transitory computer-readable medium in which a computer program is stored.

In accordance with an aspect of the present disclosure, there is provided a current control method based on feedback control performed by at least one processor including identifying a final torque value that changes according to an action of a steering wheel, controlling a motor that generates auxiliary power based on the identified final torque value, determining whether a rotation angle of the steering wheel reaches a predetermined rack end stop (RES) angle, in response to determining that the rotation angle of the steering wheel reaches the predetermined RES angle, switching the final torque value to a soft end stop (SES) torque value, and controlling the motor so that rotation of the steering wheel is limited based on the switched SES torque value.

According to an embodiment of the present disclosure, the SES torque value is generated to track a predetermined value using an SES feedback controller.

According to an embodiment of the present disclosure, the controlling of the motor so that the rotation of the steering wheel is limited based on the switched SES torque value includes controlling the motor so that the rotation of the steering wheel is limited by applying torque of an opposite sign based on the switched SES torque value.

According to an embodiment of the present disclosure, the switching of the final torque value to the SES torque value includes identifying the final torque value at the predetermined RES angle, and switching the final torque value to the SES torque value by decreasing the final torque value within a predetermined time interval.

According to an embodiment of the present disclosure, the switching of the final torque value to the SES torque value by decreasing the final torque value includes switching the final torque value to the SES torque value by increasing the SES torque value by an amount of decrease in the final torque value, such that a sum of the final torque value and the SES torque value is maintained, during the predetermined time interval, as a value corresponding to the final torque value at the predetermined RES angle.

According to an embodiment of the present disclosure, the controlling of the motor so that the rotation of the steering wheel is limited based on the switched SES torque value includes controlling the motor so that the rotation of the steering wheel is limited based on the SES torque value that decreases or increases as the steering wheel moves toward an end from the predetermined RES angle, in which the end refers to a position where the steering wheel is no longer rotated.

According to an embodiment of the present disclosure, the current control method further includes determining a rate of change of the SES torque value that decreases or increases as the steering wheel moves toward the end from the predetermined RES angle.

According to an embodiment of the present disclosure, the determining of the rate of change of the SES torque value includes identifying a speed of a vehicle and determining the rate of change of the SES torque value based on the identified speed of the vehicle.

According to an embodiment of the present disclosure, the determining of the rate of change of the SES torque value includes determining the rate of change of the SES torque value that decreases or increases as the steering wheel moves toward the end from the predetermined RES angle based on a steering angular velocity of the steering wheel.

There is provided a non-transitory computer-readable recording medium storing instructions for executing the above-described method according to an embodiment of the present disclosure in a computer.

In accordance with another aspect of the present disclosure, there is provided an EPS system including a torque sensor configured to detect torque applied to a steering wheel and output an electrical signal proportional to the detected torque, a steering sensor configured to output an electrical signal proportional to a steering angle of the steering wheel, a motor configured to generate auxiliary power applied to the steering wheel, and an electronic control unit configured to control the motor. The electronic control unit is configured to identify a final torque value that changes according to an action of the steering wheel, control the motor that generates the auxiliary power based on the identified final torque value, determine whether a rotation angle of the steering wheel reaches a predetermined rack end stop (RES) angle, in response to determining that the rotation angle of the steering wheel reaches the predetermined RES angle, switch the final torque value to a soft end stop (SES) torque value, and control the motor so that rotation of the steering wheel is limited based on the switched SES torque value.

According to an embodiment of the present disclosure, the SES torque value is generated to track a predetermined value using an SES feedback controller.

According to an embodiment of the present disclosure, the electronic control unit controls the motor so that the rotation of the steering wheel is limited by applying torque of an opposite sign based on the switched SES torque value.

According to an embodiment of the present disclosure, the electronic control unit is configured to identify the final torque value at the predetermined RES angle and switch the final torque value to the SES torque value by decreasing the final torque value within a predetermined time interval.

According to an embodiment of the present disclosure, the electronic control unit is configured to switch the final torque value to the SES torque value by increasing the SES torque value by an amount of decrease in the final torque value, such that a sum of the final torque value and the SES torque value is maintained, during the predetermined time interval, as a value corresponding to the final torque value at the predetermined RES angle.

According to an embodiment of the present disclosure, the electronic control unit is configured to control the motor so that the rotation of the steering wheel is limited based on the SES torque value that decreases or increases as the steering wheel moves toward an end from the predetermined RES angle, in which the end refers to a position where the steering wheel is no longer rotated.

According to an embodiment of the present disclosure, the electronic control unit is configured to determine a rate of change of the SES torque value that decreases or increases as the steering wheel moves toward the end from the predetermined RES angle.

According to an embodiment of the present disclosure, the electronic control unit is configured to identify a speed of a vehicle and determine the rate of change of the SES torque value based on the identified speed of the vehicle.

According to an embodiment of the present disclosure, the electronic control unit determines the rate of change of the SES torque value that decreases or increases as the steering wheel moves toward the end from the predetermined RES angle based on a steering angular velocity of the steering wheel.

There is provided a vehicle including the above-described an EPS system according to an embodiment of the present disclosure.

In accordance with still another aspect of the present disclosure, there is provided an EPS system including a torque sensor configured to detect torque applied to a steering wheel and output an electrical signal proportional to the detected torque, a steering sensor configured to output an electrical signal proportional to a steering angle of the steering wheel, a motor configured to generate auxiliary power applied to the steering wheel, and an electronic control unit configured to control the motor. The electronic control unit is configured to identify a final torque value that changes according to an action of the steering wheel, control the motor that generates the auxiliary power based on the identified final torque value, determine whether a rotation angle of the steering wheel reaches a predetermined rack end stop (RES) angle, in response to determining that the rotation angle of the steering wheel reaches the predetermined RES angle, switch the final torque value to a soft end stop (SES) torque value that has a rate of change different from a rate of change of the final torque value, and control the motor based on the switched SES torque value.

According to an embodiment of the present disclosure, the electronic control unit controls the motor so that the rotation of the steering wheel is limited by applying torque of an opposite sign based on the switched SES torque value.

According to an embodiment of the present disclosure, an absolute value of the switched SES torque value is less than or equal to an absolute value of the final torque value at the predetermined RES angle.

In various embodiments of the present disclosure, when a soft end stop control is performed using a switching scheme, the soft end stop control may be performed with a greater force because a torque of the opposite sign can be applied by being converted to a close loop control method rather than an open loop control method.

In various embodiments of the present disclosure, by using an SES feedback controller rather than a general SES controller, an SES torque value may be generated to track a specific target torque value despite external factors. In addition, since, as the close loop control method, the torque of the opposite sign can also be applied, strong control may be performed with a greater force so that the steering wheel does not touch the end.

In various embodiments of the present disclosure, by performing the soft end stop control using the switch scheme, control performance may be effectively improved because an amount of current supplied to the motor can be changed to a greater extent while eliminating the sense of heterogeneity caused by overlapping with other controllers.

In various embodiments of the present disclosure, when torque value switching is performed based on a first graph or a second graph, an SES torque value based on a feedback controller may be generated as a final torque value at an RES angle, so that the sense of heterogeneity may be effectively removed during the soft end stop control.

Effects of the present disclosure are not limited to the effects mentioned above, and other effects not mentioned will be clearly understood by a person having ordinary knowledge in the technical field to which the present disclosure pertains (referred to as "a person skilled in the art") from the description of the claims.

BRIEF DESCRIPTION OF THE DRAWINGS

Embodiments of the present disclosure will be described with reference to the accompanying drawings described below, where similar reference numerals represent similar elements, but are not limited thereto.

DETAILED DESCRIPTION

Figure 1:
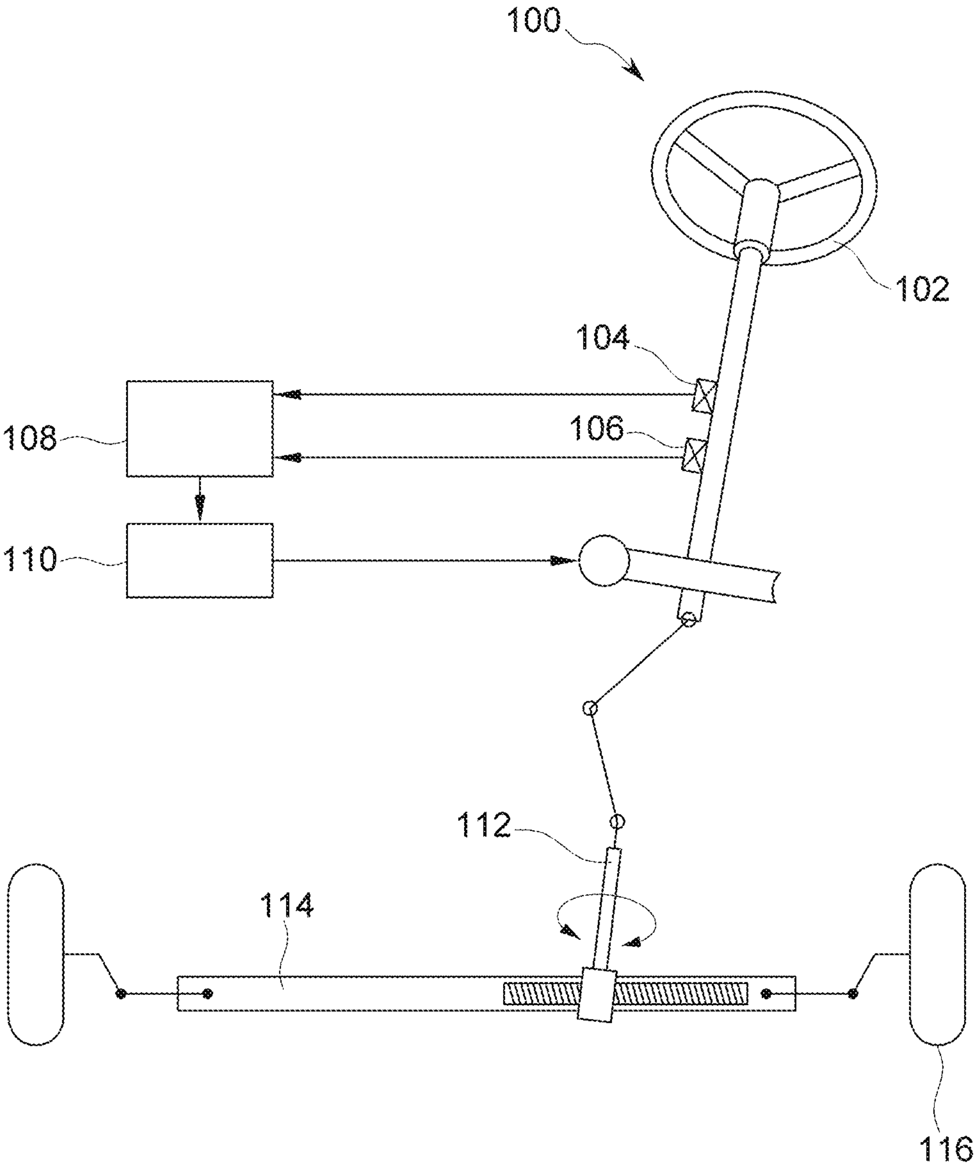
FIG. 1 is an exemplary diagram illustrating an EPS system according to an embodiment of the present disclosure.

Hereinafter, specific details for implementation of the present disclosure will be described in detail with reference to the accompanying drawings. However, in the following description, when there is a risk of unnecessarily obscuring the gist of the present disclosure, a detailed description of a widely known function or configuration will be omitted.

In the accompanying drawings, identical or corresponding components are given the same reference numeral. In addition, in the description of following embodiments, duplicate descriptions of the same or corresponding components may be omitted. However, even if the description of a component is omitted, it is not intended that such component is not included in any embodiment.

Advantages and features of the disclosed embodiments, and methods of achieving them, will be apparent with reference to the embodiments described below along with the accompanying drawings. However, the present disclosure may be implemented in various other forms, but not limited to the embodiments disclosed below, only to ensure that the present disclosure is complete, and is provided to fully inform a person skilled in the art of the scope of the invention.

Terms used herein will be briefly described, and disclosed embodiments will be described in detail. The terms used herein have been selected from currently widely used general terms as much as possible while considering functions of the present disclosure, but these may vary depending on the intentions or precedents of those skilled in the art, the emergence of new technologies, and the like. In addition, in a specific case, there is a term arbitrarily selected by the applicant, and in this case, its meaning will be described in detail in the detailed description of the invention. Therefore, the terms used in the present disclosure should not be defined as simple names of terms, but based on meanings of the terms and the overall contents of the present disclosure.

The singular forms are intended to include the plural forms, unless the context clearly specifies that they are singular. In addition, the plural forms include the singular forms, unless the context clearly specifies that they are plural. When it is described that a part includes a component in the entire specification, this means that other components may be further included without excluding other components unless stated to the contrary.

In the present disclosure, the terms "comprises", "comprising", and the like may indicate the presence of features, steps, operations, elements, and/or components, but do not preclude addition of one or more other functions, steps, operations, elements, components, and/or combinations thereof.

In the present disclosure, when it is mentioned that a particular component is "coupled", "combined", or "connected" or "reacts" to any other component, the particular component may be directly coupled, combined, and/or connected to, or react to the other component, but is not limited thereto. For example, there may be one or more intermediate components between the particular component and the other component. In addition, in the present disclosure, "and/or" may include a combination of each or at least a part of one or more items listed.

In the present disclosure, terms such as "first", "second", etc. are used to distinguish a particular component from another component, and the component described above is not limited by such terms. For example, a "first" component may be an element of the same or similar type to a "second" component.

In the present disclosure, "soft end stop" may be a technique for varying an amount of current control at the end to prevent a steering wheel from touching a right end or a left end.

In the present disclosure, an "EPS system" is electric power steering that assists a driver's steering force by using rotational force of a motor, and may include a torque sensor that detects torque applied to a steering wheel and outputs an electrical signal proportional to the detected torque, a steering sensor that outputs an electrical signal proportional to a steering angle of the steering wheel, a motor that generates auxiliary power applied to the steering wheel, and an electronic control unit that controls the motor.

FIG. 1 is an exemplary diagram illustrating an EPS system 100 according to an embodiment of the present disclosure. As shown, the EPS system 100 may include a steering system connected from a steering wheel 102 to wheels 116 on both sides, and an auxiliary power mechanism that provides steering assistance power to the steering system.

According to one embodiment, the steering system may include the steering wheel 102 and a steering shaft. Here, one side of the steering shaft may be connected to the steering wheel 102 and rotate with the steering wheel 102, and the other side may be connected to a pinion shaft 112 through a pair of universal joints. In addition, the pinion shaft 112 may be connected to a rack bar 114 through a rack and pinion mechanism, and both ends of the rack bar 114 may be connected to wheels 116 of a vehicle through a tie rod and a knuckle arm.

According to an embodiment, the auxiliary power mechanism may include a steering sensor 104, a torque sensor 106, an electronic control unit 108, a motor 110, a reducer, and the like. Here, the motor 110 may generate auxiliary power based on a control signal transmitted from the electronic control unit 108. In this case, the reducer may include a worm gear and a worm wheel gear for transmitting the auxiliary power generated from the motor 110 to the steering shaft.

The steering sensor 104 may output an electrical signal proportional to a steering angle of the steering wheel 102 generated by rotation of the steering wheel 102, and generate an electrical signal of (+) or (−) according to the direction of the rotation of the steering wheel 102. According to one embodiment, here, the left end refers to a position where the steering wheel 102 can no longer be rotated by being rotated to the left, and the right end refers to a position where the steering wheel 102 can no longer be rotated by being rotated to the right. Further, a center position may refer to a state in which the wheels 116 are parallel to the body of the vehicle and the steering wheel 102 is not rotated.

The torque sensor 106 is mounted on the steering shaft to detect torque applied by the driver on the steering wheel 102 and may output an electrical signal proportional to the detected torque. At this time, the torque sensor 106 may output an electrical signal of (+) or (−) according to the direction of the rotation of the steering wheel 102.

According to an embodiment, the electronic control unit 108 may perform steering control based on information received from the steering sensor 104, the torque sensor 106, and the like, and status information of the vehicle. In other words, the electronic control unit 108 may perform steering control by adjusting an amount of current provided to the motor 110 and the direction of rotation of the motor 110. For example, when the electronic control unit 108 increases the amount of current provided to the motor 110, more auxiliary power is generated so that the driver may comfortably control the steering wheel 102. In another example, when the electronic control unit 108 decreases the amount of current provided to the motor 110, it may be difficult for the driver to control the steering wheel 102.

According to one embodiment, the electronic control unit 108 may perform soft end stop control to improve noise and vibration generated when the steering wheel 102 rotates to the end to come into contact with a mechanism (e.g., an end stopper). For example, when the steering wheel 102 rotates to near the end, the electronic control unit 108 may perform control to decrease the amount of current provided to the motor 110 so that the driver can no longer rotate the steering wheel 102.

According to one embodiment, the electronic control unit 108 may perform the soft end stop control to track a specific torque value using an SES feedback controller rather than the general SES (soft end stop) controller. For example, while there is an issue in that, even if a target torque value exists when using an existing SES controller, the target torque value is not normally output due to external factors such as friction, the soft end stop control may be effectively performed when using the SES feedback controller because the target torque value can be continuously tracked even by external factors.

According to one embodiment, the electronic control unit 108 may perform the soft end stop control using the switching scheme. For example, the electronic control unit 108 may determine whether a rotation angle of the steering wheel 102 corresponds to a predetermined rack end stop (RES) angle, and perform motor control by switching a final torque value into an SES torque value in response to determining that the rotation angle of the steering wheel 102 corresponds to the predetermined RES angle. By this configuration, when the soft end stop control is performed using the switching scheme, it is possible to perform the soft end stop control with greater force because torque of an opposite sign (e.g., (−) when (+), (+) when (−)) can be applied by converting to a close loop control method instead of an open loop control method.

Figure 2:
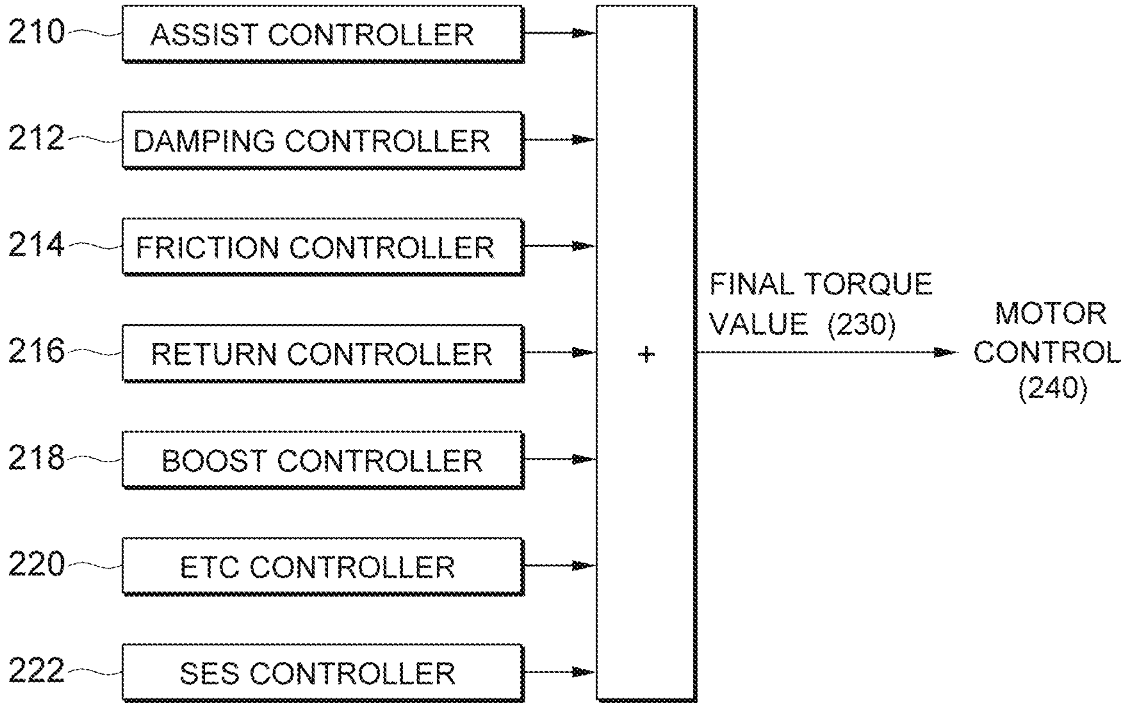
FIG. 2 is a block diagram illustrating an example of a general soft end stop control method.

FIG. 2 is a block diagram illustrating an example of a general soft end stop control method. According to one embodiment, the electronic control unit 108 of the EPS system may generate a final torque value 230 based on torque values input from various controllers of the vehicle, and perform motor control 240 based on the generated final torque value 230.

As shown, associated torque may be generated from each controller. For example, assist torque (Assist Tq) may be generated from an assist controller 210, damping torque (DampgTq) may be generated from a damping controller 212, friction torque (FricTq) may be generated from a friction controller 214, return torque (RetTq) may be generated from a return controller 216, boost torque (BoostTq) may be generated from a boost controller 218, ETC torque (ETCTq) may be generated from an ETC controller 220, and SES torque (SESTq) may be generated from an SES controller 222.

According to one embodiment, the torque generated from each controller may be combined to generate the final torque value 230. In this case, the SES torque may be load torque applied in the opposite direction (i.e., a center direction) from the end of the steering wheel based on the steering angle. In other words, when the steering wheel rotates by the predetermined RES angle or more for the soft end stop control, the SES torque may be generated and the final torque value 230 including the generated SES torque may be generated, and thus the motor control 240 may be performed. However, since the conventional method is the open loop control method as described above, there is a disadvantage in that a specific target torque cannot be tracked and it is vulnerable to external factors. In addition, this method has a limitation of zero (0) Nm of torque value that can be reduced to the maximum.

Figure 3:
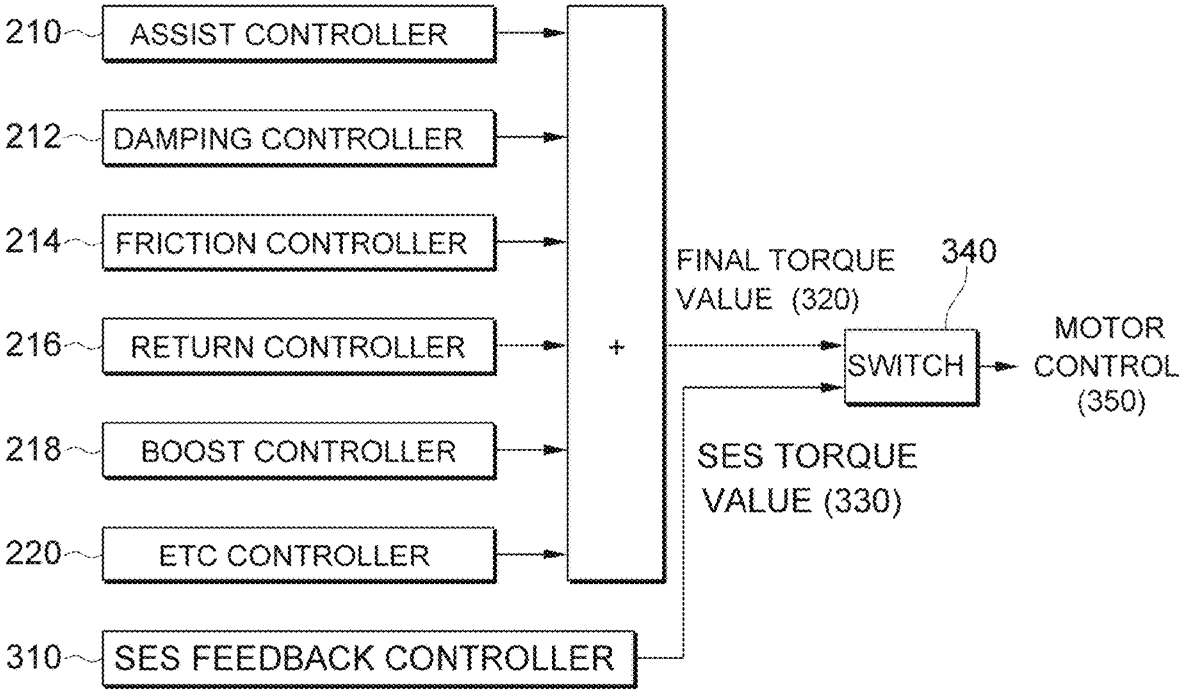
FIG. 3 is a block diagram illustrating an example of a soft end stop control method according to an embodiment of the present disclosure.

FIG. 3 is a block diagram illustrating an example of a soft end stop control method according to an embodiment of the present disclosure. According to an embodiment, an electronic control unit 108 of an EPS system may generate a final torque value 320 based on torque values input from various controllers of a vehicle, and motor control 350 may be performed based on the generated final torque value 320.

As shown, associated torque may be generated from each controller. For example, assist torque (Assist Tq) may be generated from the assist controller 210, damping torque (DampgTq) may be generated from the damping controller 212, friction torque (FricTq) may be generated from the friction controller 214, return torque (RetTq) may be generated from the return controller 216, boost torque (BoostTq) may be generated from the boost controller 218, ETC torque (ETCTq) may be generated from the ETC controller 220, and SES torque (SESTq) may be generated from an SES feedback controller 310.

According to an embodiment, the remaining torque except an SES torque value 330 generated by the SES feedback controller 310 may be combined to generate the final torque value 320. In this case, the electronic control unit 108 may identify the final torque value 320 changing with operation of the steering wheel and perform the motor control 350 to generate auxiliary power based on the identified final torque value 320. In other words, the electronic control unit 108 may generate and provide the steering wheel with appropriate auxiliary power so that the driver can easily steer the steering wheel according to the final torque value 320.

According to an embodiment, the electronic control unit 108 may determine whether a rotation angle of the steering wheel corresponds to a predetermined RES angle, and in response to determining that the rotation angle of the steering wheel corresponds to the predetermined RES angle, the final torque value 320 may be switched to the SES torque value 330 using a switch 340. Here, the SES torque value 330 is a value that changes to track a predetermined value according to the rotation angle of the steering wheel, and as the steering wheel is oriented toward the end from the predetermined RES angle, it may decrease or increase according to a specific rate of change (e.g., tilt). The electronic control unit 108 may then control the motor such that rotation of the steering wheel is limited based on the SES torque value 330 switched as described above.

According to one embodiment, the electronic control unit 108 may control the motor to limit the rotation of the steering wheel based on the SES torque value 330 that decreases or increases as the steering wheel moves toward the end from the predetermined RES angle. In this case, the rate of change of the SES torque value 330 may be determined. Here, the rate of change of the SES torque value 330 may be determined according to the speed of the vehicle, the steering angle of the steering wheel, a steering angular velocity, and the like. For example, the greater the steering angular velocity of the steering wheel, the faster the time for the steering wheel to reach the end, so the rate of change of the SES torque value 330 may increase. In other words, the electronic control unit 108 may perform soft end stop control according to the SES torque value 330, which changes as the steering wheel moves toward the end of from the predetermined RES angle.

With this configuration, the SES torque value 330 may be generated to track a specific target torque value despite external factors by using the SES feedback controller 310 rather than the general SES controller. In addition, since even the torque of the opposite sign can be applied as the close loop control method, strong control may be performed with greater force so that the steering wheel does not come into contact with the end.

Figure 4:
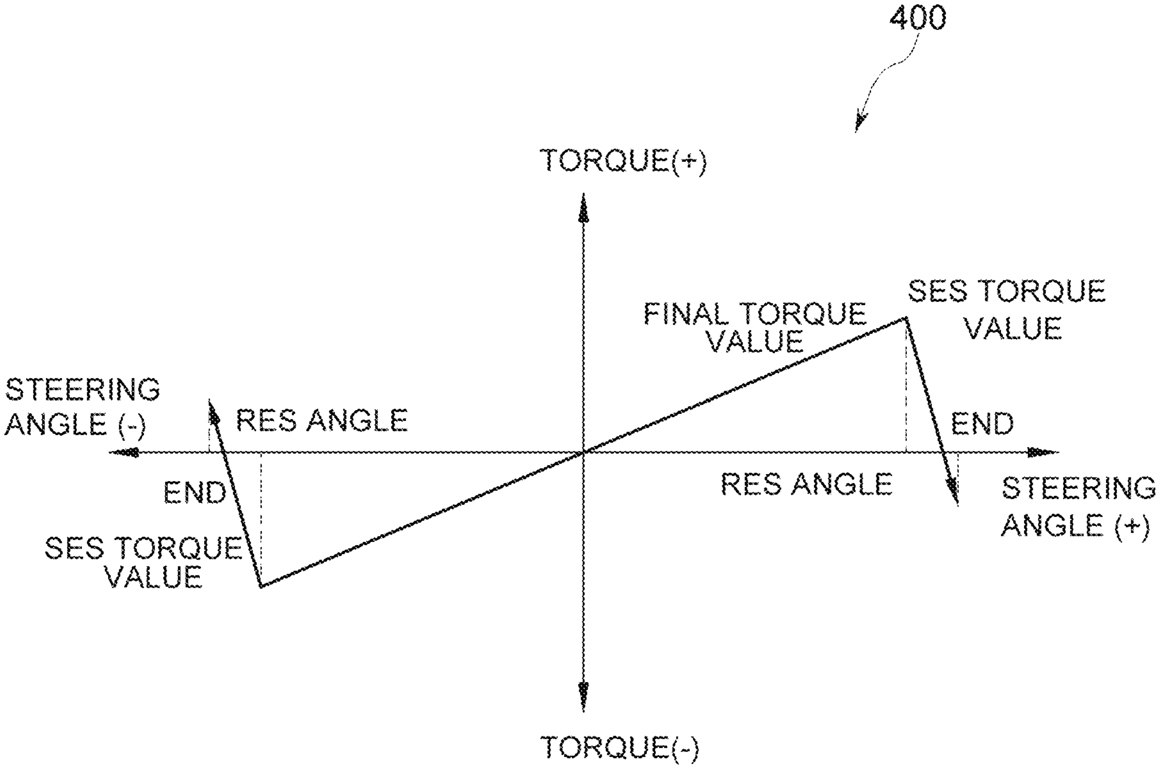
FIG. 4 is a diagram illustrating an example of a torque value changing according to a steering angle of a steering wheel according to an embodiment of the present disclosure.

FIG. 4 is a diagram 400 illustrating an example of a torque value changing according to the steering angle of the steering wheel according to an embodiment of the present disclosure. As described above, when the driver rotates the steering wheel, auxiliary power to assist the driver's steering may be provided to the steering wheel. For example, the electronic control unit 108 may control the motor for generating the auxiliary power based on the final torque value. Additionally, the soft end stop control may be performed so that the steering wheel does not come into contact with the end, and the electronic control unit 108 may limit the auxiliary power by controlling the motor based on the SES torque value.

As shown, up to the RES angle, the final torque value may be used for motor control. For example, when the driver rotates the steering wheel in the forward direction, a (+) torque value may be generated, and when the driver rotates the steering wheel in the reverse direction, a (−) torque value may be generated.

According to an embodiment, when the rotation angle (e.g., steering angle) of the steering wheel corresponds to the RES angle, the final torque value may be switched to the SES torque value. For example, the electronic control unit 108 may identify the final torque value at the RES angle and generate and switch the SES torque value to have the identified final torque value. The electronic control unit 108 may then apply the torque of the opposite sign by increasing or decreasing the SES torque value for the soft end stop control. For example, when the driver rotates the steering wheel in the forward direction, a torque value of (−) at the steering angle after the RES angle may be applied to limit the rotation of the steering wheel in the forward direction. In another example, when the driver rotates the steering wheel in the reverse direction, a (+) torque value may be applied at the steering angle after the RES angle to limit the rotation of the steering wheel in the reverse direction.

In FIG. 4, the SES torque value is shown as decreasing or increasing based on a specific rate of change, but is not limited thereto, and the rate of change of the SES torque value may be variable. In addition, in FIG. 4, the SES torque value is shown to change to the torque value of the opposite sign, but is not limited thereto, and it is possible to change up to the torque value of the same sign. With this configuration, by performing the soft end stop control using the switch scheme, control performance may be effectively improved because the amount of current supplied to the motor can be more varied while eliminating the sense of heterogeneity caused by overlapping with other controllers.

Figure 5:
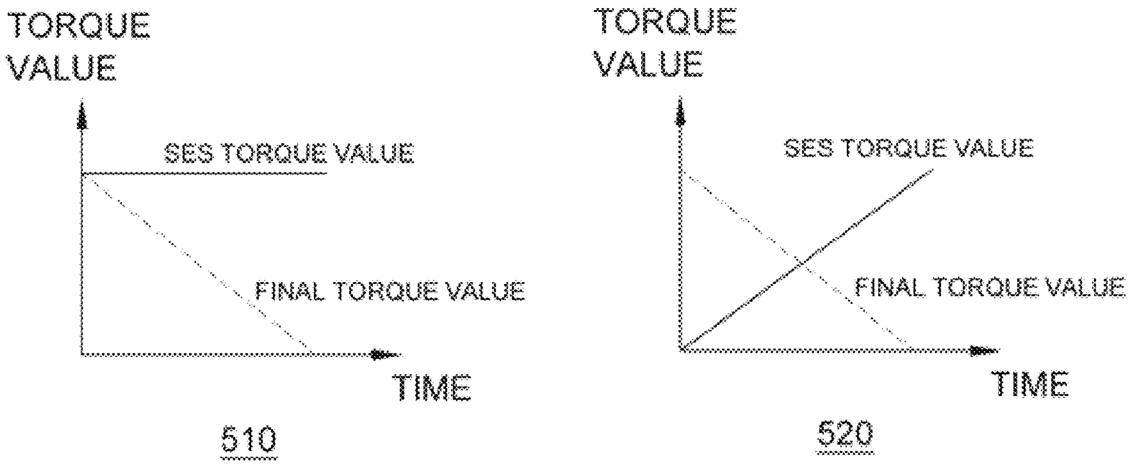
FIG. 5 is a diagram illustrating an example of switching a torque value at a predetermined RES angle according to an embodiment of the present disclosure.

FIG. 5 is a diagram illustrating an example of switching a torque value at the predetermined RES angle according to an embodiment of the present disclosure. According to one embodiment, the electronic control unit 108 may identify the final torque value at the predetermined RES angle and switch the final torque value to the SES torque value by decreasing the final torque value.

According to one embodiment, the torque value switching may be performed within a predetermined time interval. Here, the predetermined time interval may be a time interval determined so that the driver does not feel the sense of heterogeneity. As shown, a first graph 510 may show that the SES torque value is maintained as the final torque value at the RES angle and that the final torque value decreases within the predetermined time interval. In addition, a second graph 520 shows that the torque value switching is performed within the predetermined time interval where the SES torque value is increased by an amount of the decrease in the final torque value. In other words, according to the second graph 520, while the torque value is switched, the sum of the final torque value and the SES torque value may be maintained, during the predetermined time interval, as a value corresponding to the final torque value at the RES angle. According to one embodiment, after the torque value switching period (i.e., the predetermined time interval) ends, the motor may be controlled by the SES feedback controller 310 to track a specific target torque value set as shown in, for example, FIG. 4 such that rotation of the steering wheel is limited based on the SES torque value.

By this configuration, when the torque value switching is performed based on the first graph 510 or the second graph 520, an SES torque value based on the feedback controller 310 may be generated as the final torque value at the RES angle, so the sense of heterogeneity may be effectively eliminated during the soft end stop control.

Figure 6:
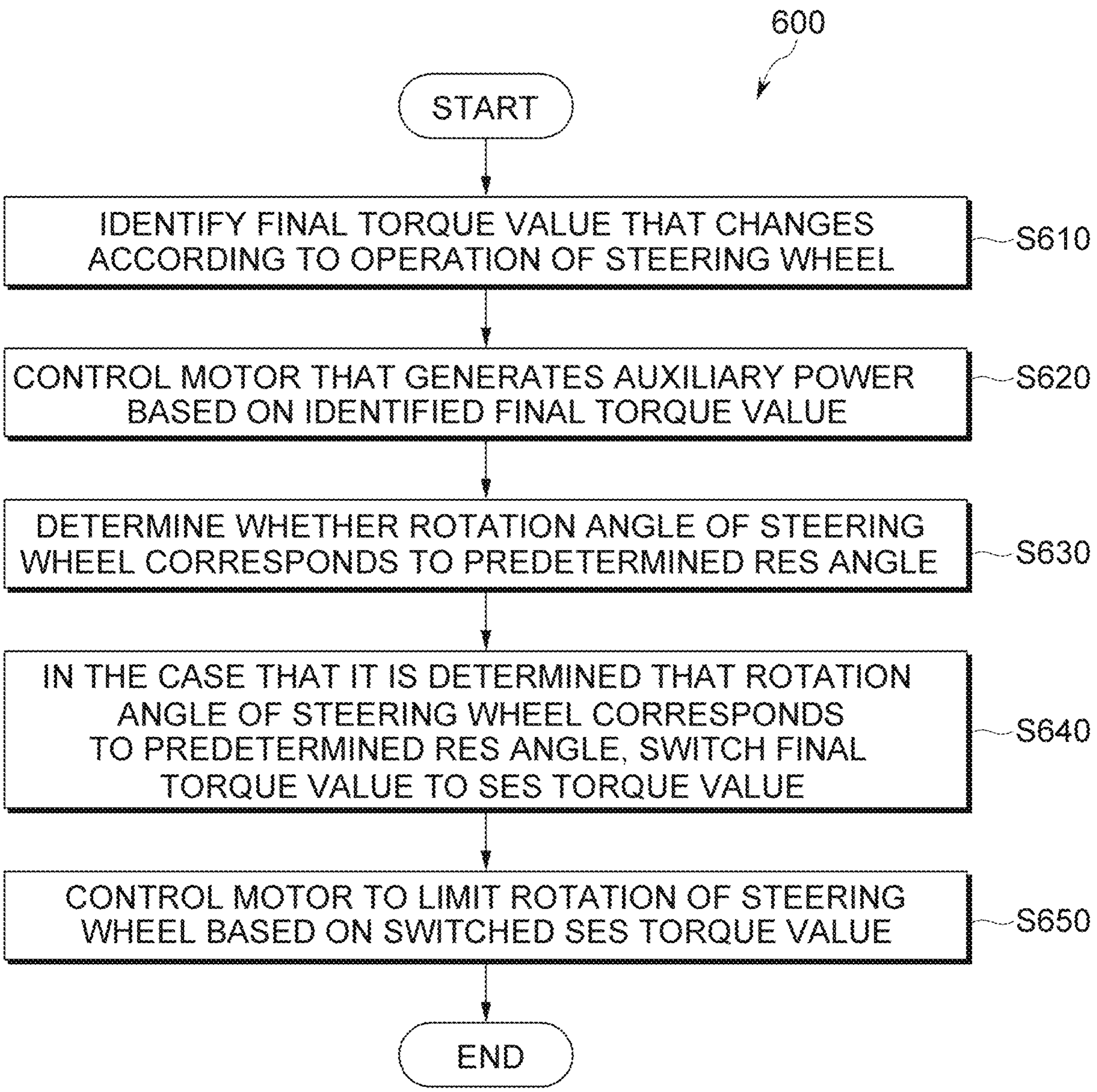
FIG. 6 is a flowchart illustrating an example of a current control method based on feedback control according to an embodiment of the present disclosure.

FIG. 6 is a flowchart illustrating an example of a current control method based on feedback control 600 according to an embodiment of the present disclosure. The current control method based on feedback control 600 may be performed by at least one processor (e.g., at least one processor of the electronic control unit 108). The current control method based on feedback control 600 may be initiated when the processor identifies the final torque value that changes according to the operation of the steering wheel (S610). In this case, the processor may control the motor that generates auxiliary power based on the identified final torque value (S620).

The processor may determine whether the rotation angle of the steering wheel corresponds to the predetermined RES angle (S630). In response to determining that the rotation angle of the steering wheel corresponds to the predetermined RES angle, the processor may switch the final torque value to the SES torque value (S640). Here, an SES torque value may be generated to track a predetermined value using the SES feedback controller 310. For example, the processor may identify the final torque value at the predetermined RES angle and decrease the final torque value to switch the final torque value to the SES torque value. In this case, the processor may switch the final torque value to the SES torque value by increasing the SES torque value to correspond to the amount of the decrease in the final torque value, but is not limited thereto.

The processor may control the motor to limit the rotation of the steering wheel based on the switched SES torque value (S650). For example, the processor may control the motor to limit the rotation of the steering wheel by applying a torque of the opposite sign based on the switched SES torque value. In this case, the processor may control the motor to limit the rotation of the steering wheel based on the SES torque value that decreases or increases as the steering wheel moves toward the end from the predetermined RES angle.

According to one embodiment, the processor may determine the rate of change of the SES torque value that decreases or increases as the steering wheel moves toward the end from the predetermined RES angle. In this case, the processor may identify the speed of the vehicle and determine the rate of change of the SES torque value determined based on the identified speed of the vehicle. Additionally, or alternatively, the processor may determine the rate of change of the SES torque value that decreases or increases as the steering wheel moves toward the end from the predetermined RES angle based on the steering angular velocity of the steering wheel.

The methods described above and/or various embodiments may be realized with digital electronic circuits, computer hardware, firmware, software, and/or combinations thereof. Various embodiments of the present disclosure may be implemented as computer programs executed by a data processing device, e.g., one or more programmable processors and/or one or more computing devices, or stored in a computer-readable recording medium and/or a computer-readable recording medium. The computer program as described above may be written in any form of programming language, including compiled languages or interpreted languages, and may be distributed in any form such as stand-alone programs, modules, subroutines, and the like. A computer program may be distributed through one computing device, a plurality of computing devices connected over the same network, and/or a plurality of computing devices distributed to be connected over a plurality of different networks.

The methods described above and/or various embodiments may be performed by one or more processors configured to execute one or more computer programs that process, store, and/or manage any function, function, etc., by operating based on input data or generating output data. For example, the methods and/or various embodiments of the present disclosure may be performed by a special purpose logic circuit such as a Field Programmable Gate Array (FPGA) or an Application Specific Integrated Circuit (ASIC), and the apparatus and/or system for performing the methods and/or embodiments of the present disclosure may be implemented as a special purpose logic circuit such as an FPGA or ASIC.

One or more processors executing computer programs may include general purpose or special purpose microprocessors and/or one or more processors of any kind of digital computing device. The processor may receive instructions and/or data from each of read-only memory and random access memory, or may receive instructions and/or data from read-only memory and random access memory. In the present disclosure, components of a computing device performing methods and/or embodiments may include one or more processors for executing instructions, and one or more memory devices for storing instructions and/or data.

According to one embodiment, the computing device may exchange data with one or more mass storage devices for storing data. For example, the computing device may receive data from a magnetic disk or optical disc and/or transmit data to a magnetic disk or optical disk. A computer-readable recording medium suitable for storing instructions and/or data associated with a computer program may include, but is not limited to, any form of nonvolatile memory, including semiconductor memory devices such as Erasable Programmable Read-Only Memory (EPROM), Electrically Erasable PROM (EEPROM), flash memory devices, and the like. For example, a computer-readable recording medium may include a magnetic disk such as an internal hard disk or a removable disk, an optical optical disk, a CD-ROM, and a DVD-ROM disk.

In order to provide interaction with a user, the computing device may include a display device for providing or displaying information to the user (e.g., a Cathode Ray Tube (CRT), a Liquid Crystal Display (LCD), etc., and a pointing device (e.g., keyboard, mouse, trackball, etc.) that allows the user to provide input and/or commands on the computing device, but is not limited thereto. In other words, the computing device may further include any other kind of devices for providing interaction with the user. For example, the computing device may provide any form of sensory feedback to the user, including visual feedback, auditory feedback, and/or tactile feedback, for interaction with the user. In response, the user may provide input to the computing device through various gestures such as sight, voice, and motion.

In the present disclosure, various embodiments may be implemented in a computing system including a backend component (e.g., a data server), a middleware component (e.g., an application server), and/or a front-end component. In this case, the components may be interconnected by any form or medium of digital data communication, such as a communication network. For example, the communication network may include a local area network (LAN), a wide area network (WAN), and the like.

A computing device based on the exemplary embodiments described herein may be implemented using hardware and/or software configured to interact with the user, including a user device, a user interface (UI) device, a user terminal or a client device. For example, the computing device may include a portable computing device such as a laptop computer. Additionally or alternatively, the computing device may include, but is not limited to, personal digital assistants (PDAs), tablet PCs, game consoles, wearable devices, internet of things (IoT) devices, virtual reality (VR) devices, augmented reality (AR) devices, and the like. The computing device may further include other types of devices configured to interact with the user. In addition, the computing device may include portable communication devices (eg, mobile telephones, smart phones, wireless cellular phones, etc.) suitable for wireless communication over a network such as a mobile communication network. A computing device may use a radio frequency (RF; Radio Frequency), microwave frequency (MWF; Microwave Frequency), and/or infrared ray frequency (IRF; Infrared Ray Frequency) may be configured to communicate wirelessly with a network server using wireless communication techniques and/or protocols.

In the present disclosure, various embodiments including certain structural and functional details are exemplary. Accordingly, embodiments of the present disclosure are not limited to those described above, and may be implemented in various other forms. In addition, the terms used in the present disclosure are intended to describe some embodiments and are not construed as limiting the embodiments. For example, singular words and the above terms may be construed to include plural forms unless otherwise clearly indicated in context.

In the present disclosure, unless otherwise defined, all terms used herein, including technical or scientific terms, have the same meaning as commonly understood by those skilled in the art to which these concepts pertain. In addition, terms defined in dictionaries generally used should be construed to have meanings matching contextual meanings in the related art.

Although the present disclosure has been described in connection with some embodiments herein, various modifications and changes may be made within the scope of the present disclosure that can be understood by those skilled in the art to which the present disclosure pertains. In addition, such modifications and changes should be considered to fall within the scope of the claims appended herein.

What is claimed is:

1. A current control method based on feedback control performed by at least one processor, the current control method comprising:

identifying a final torque value that changes according to an action of a steering wheel;

controlling a motor that generates auxiliary power based on the identified final torque value;

determining whether a rotation angle of the steering wheel reaches a predetermined rack end stop (RES) angle;

in response to determining that the rotation angle of the steering wheel reaches the predetermined RES angle, switching the final torque value to a soft end stop (SES) torque value; and controlling the motor so that rotation of the steering wheel is limited based on the switched SES torque value, wherein the switching of the final torque value to the SES torque value comprises:

identifying the final torque value at the predetermined RES angle; and switching the final torque value to the SES torque value by decreasing the final torque value within a predetermined time interval, and wherein the switching of the final torque value to the SES torque value by decreasing the final torque value comprises switching the final torque value to the SES torque value by increasing the SES torque value by an amount of decrease in the final torque value, such that a sum of the final torque value and the SES torque value is maintained, during the predetermined time interval, as a value corresponding to the final torque value at the predetermined RES angle.

2. The current control method of claim 1, wherein the SES torque value is generated to track a predetermined value using an SES feedback controller.

3. The current control method of claim 1, wherein the controlling of the motor so that the rotation of the steering wheel is limited based on the switched SES torque value comprises controlling the motor so that the rotation of the steering wheel is limited by applying torque of an opposite sign based on the switched SES torque value.

4. The current control method of claim 1, wherein the controlling of the motor so that the rotation of the steering wheel is limited based on the switched SES torque value comprises controlling the motor so that the rotation of the steering wheel is limited based on the SES torque value that decreases or increases as the steering wheel moves toward an end from the predetermined RES angle, wherein the end refers to a position where the steering wheel is no longer rotated.

5. The current control method of claim 4, further comprising:

determining a rate of change of the SES torque value that decreases or increases as the steering wheel moves toward the end from the predetermined RES angle.

6. The current control method of claim 5, wherein the determining of the rate of change of the SES torque value comprises:

identifying a speed of a vehicle; and determining the rate of change of the SES torque value based on the identified speed of the vehicle.

7. The current control method of claim 5, wherein the determining of the rate of change of the SES torque value comprises determining the rate of change of the SES torque value that decreases or increases as the steering wheel moves toward the end from the predetermined RES angle based on a steering angular velocity of the steering wheel.

8. A non-transitory computer-readable recording medium storing instructions for execution by one or more processors that, when executed by the one or more processors, cause the one or more processors to perform the method according to claim 1.

9. An electric power steering (EPS) system comprising:

a torque sensor configured to detect torque applied to a steering wheel and output an electrical signal proportional to the detected torque;

a steering sensor configured to output an electrical signal proportional to a steering angle of the steering wheel;

a motor configured to generate auxiliary power applied to the steering wheel; and an electronic control unit configured to control the motor, wherein the electronic control unit is configured to:

identify a final torque value that changes according to an action of the steering wheel;

control the motor that generates the auxiliary power based on the identified final torque value;

determine whether a rotation angle of the steering wheel reaches a predetermined rack end stop (RES) angle;

in response to determining that the rotation angle of the steering wheel reaches the predetermined RES angle, switch the final torque value to a soft end stop (SES) torque value; and control the motor so that rotation of the steering wheel is limited based on the switched SES torque value, and wherein the electronic control unit is configured to:

identify the final torque value at the predetermined RES angle; and switch the final torque value to the SES torque value by decreasing the final torque value within a predetermined time interval and increasing the SES torque value by an amount of decrease in the final torque value, such that a sum of the final torque value and the SES torque value is maintained as a value corresponding to the final torque value at the predetermined RES angle.

10. The EPS system of claim 9, wherein the SES torque value is generated to track a predetermined value using an SES feedback controller.

11. The EPS system of claim 9, wherein the electronic control unit is configured to control the motor so that the rotation of the steering wheel is limited by applying torque of an opposite sign based on the switched SES torque value.

12. The EPS system of claim 9, wherein the electronic control unit is configured to control the motor so that the rotation of the steering wheel is limited based on the SES torque value that decreases or increases as the steering wheel moves toward an end from the predetermined RES angle, and wherein the end refers to a position where the steering wheel is no longer rotated.

13. The EPS system of claim 12, wherein the electronic control unit is configured to determine a rate of change of the SES torque value that decreases or increases as the steering wheel moves toward the end from the predetermined RES angle.

14. The EPS system of claim 13, wherein the electronic control unit is configured to identify a speed of a vehicle and determine the rate of change of the SES torque value based on the identified speed of the vehicle.

15. The EPS system of claim 13, wherein the electronic control unit is configured to determine the rate of change of the SES torque value that decreases or increases as the steering wheel moves toward the end from the predetermined RES angle based on a steering angular velocity of the steering wheel.

16. A vehicle comprising the electric power steering (EPS) system of claim 9.

17. An electric power steering (EPS) system comprising:

a torque sensor configured to detect torque applied to a steering wheel and output an electrical signal proportional to the detected torque;

a steering sensor configured to output an electrical signal proportional to a steering angle of the steering wheel;

a motor configured to generate auxiliary power applied to the steering wheel; and an electronic control unit configured to control the motor, wherein the electronic control unit is configured to:

identify a final torque value that changes according to an action of the steering wheel;

control the motor that generates the auxiliary power based on the identified final torque value;

determine whether a rotation angle of the steering wheel reaches a predetermined rack end stop (RES) angle;

in response to determining that the rotation angle of the steering wheel reaches the predetermined RES angle, switch the final torque value to a soft end stop (SES) torque value that has a rate of change different from a rate of change of the final torque value; and control the motor based on the switched SES torque value, and wherein the electronic control unit is configured to:

identify the final torque value at the predetermined RES angle; and switch the final torque value to the SES torque value by decreasing the final torque value within a predetermined time interval and increasing the SES torque value by an amount of decrease in the final torque value, such that a sum of the final torque value and the SES torque value is maintained as a value corresponding to the final torque value at the predetermined RES angle.

18. The EPS system of claim 17, wherein the electronic control unit is configured to control the motor so that rotation of the steering wheel is limited by applying torque of an opposite sign based on the switched SES torque value.

19. The EPS system of claim 17, wherein an absolute value of the switched SES torque value is less than or equal to an absolute value of the final torque value at the predetermined RES angle.

* * * * *